US011290144B2

United States Patent
Yoshida

(10) Patent No.: US 11,290,144 B2
(45) Date of Patent: Mar. 29, 2022

(54) RADIO FREQUENCY MODULE AND COMMUNICATION DEVICE

(71) Applicant: MURATA MANUFACTURING CO., LTD., Nagaokakyo (JP)

(72) Inventor: Daisuke Yoshida, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 0 days.

(21) Appl. No.: 17/128,218

(22) Filed: Dec. 21, 2020

(65) Prior Publication Data
US 2021/0203372 A1    Jul. 1, 2021

(30) Foreign Application Priority Data

Dec. 26, 2019  (JP) .............................. JP2019-237242

(51) Int. Cl.
| | |
|---|---|
| H03F 3/195 | (2006.01) |
| H05K 1/02 | (2006.01) |
| H01L 23/48 | (2006.01) |
| H01L 23/488 | (2006.01) |
| H04B 1/40 | (2015.01) |

(52) U.S. Cl.
CPC ...................... H04B 1/40 (2013.01)

(58) Field of Classification Search
None
See application file for complete search history.

(56) References Cited

U.S. PATENT DOCUMENTS

| | | | | |
|---|---|---|---|---|
| 6,777,787 | B2 * | 8/2004 | Shibata ................. | H01L 25/105 257/666 |
| 6,815,254 | B2 * | 11/2004 | Mistry .................... | H01L 21/56 257/685 |
| 7,205,647 | B2 * | 4/2007 | Karnezos ............ | H01L 23/3128 257/678 |

(Continued)

FOREIGN PATENT DOCUMENTS

| WO | 2005/078796 A1 | 8/2005 |
|---|---|---|
| WO | 2018/168500 A1 | 9/2018 |

OTHER PUBLICATIONS

Korean Office Action dated Jan. 19, 2022, in corresponding Korean Patent Application No. 10-2020-0177095, 8 pages.

*Primary Examiner* — Tuan A Tran

(74) *Attorney, Agent, or Firm* — Xsensus LLP

(57) ABSTRACT

A radio frequency module includes: a module board including first and second principal surfaces on opposite sides of the module board; a semiconductor integrated circuit (IC) including third and fourth principal surfaces on opposite sides of the semiconductor IC; and an external-connection terminal disposed on the second principal surface. The third principal surface faces the second principal surface and is closer to the second principal surface than the fourth principal surface is to the second principal surface, and the semiconductor IC includes: at least one of (i) a power amplifier (PA) control circuit configured to control a radio frequency component using a control signal, (ii) a low noise amplifier configured to amplify a reception signal, or (iii) a switch; and a signal electrode disposed on the fourth principal surface, and via the signal electrode the semiconductor IC is configured to receive or output a radio frequency signal and/or the control signal.

20 Claims, 6 Drawing Sheets

(56) References Cited

U.S. PATENT DOCUMENTS

| | | | | |
|---|---|---|---|---|
| 7,245,884 B2* | 7/2007 | Oida | ...................... | H01L 23/552 |
| | | | | 257/E23.114 |
| 7,389,570 B2* | 6/2008 | Yokota | ..................... | H03H 3/08 |
| | | | | 29/25.35 |
| 7,394,665 B2* | 7/2008 | Hamasaki | ............ | H05K 7/1092 |
| | | | | 361/803 |
| 7,829,989 B2* | 11/2010 | Sun | ..................... | H01L 23/5389 |
| | | | | 257/686 |
| 8,022,523 B2* | 9/2011 | Chen | .................. | H01L 25/0657 |
| | | | | 257/686 |
| 8,124,453 B2* | 2/2012 | Sun | ..................... | H01L 23/3677 |
| | | | | 438/109 |
| 8,247,898 B2* | 8/2012 | Ono | ..................... | H01L 21/561 |
| | | | | 257/690 |
| 8,373,997 B2* | 2/2013 | Kobayashi | ........ | H01L 23/49816 |
| | | | | 361/783 |
| 8,952,262 B2* | 2/2015 | Yamashita | ............. | H05K 1/185 |
| | | | | 174/260 |
| 9,905,482 B2* | 2/2018 | Ishii | ........................ | H01L 22/14 |
| 2005/0001301 A1* | 1/2005 | Aoyagi | .................. | H01L 24/32 |
| | | | | 257/686 |
| 2006/0001179 A1* | 1/2006 | Fukase | ............. | H01L 23/49827 |
| | | | | 257/778 |
| 2008/0067656 A1* | 3/2008 | Leung | ................ | H01L 23/5385 |
| | | | | 257/686 |
| 2019/0267339 A1 | 8/2019 | Murase | | |
| 2020/0253040 A1* | 8/2020 | Dalmia | .................. | H01L 25/18 |

* cited by examiner

RADIO FREQUENCY MODULE AND COMMUNICATION DEVICE

CROSS REFERENCE TO RELATED APPLICATION

The present application is based on and claims priority to Japanese Patent Application No. 2019-237242 filed on Dec. 26, 2019. The entire disclosure of the above-identified application, including the specification, drawings and claims is incorporated herein by reference in its entirety.

TECHNICAL FIELD

The present disclosure relates to a radio frequency (RF) module and a communication device.

BACKGROUND

In mobile communication apparatuses such as mobile phones, the total number of circuit elements included in radio frequency front-end circuits is increasing, particularly with developments in multiband technologies.

WO 2005/078796 discloses an electronic component (a circuit module) in which circuit elements included in a radio frequency front-end circuit are mounted on both sides of a mounting board. Of the two opposite mounting surfaces of a double-sided mounting core substrate, passive chip components are mounted on a first mounting surface on which external terminal electrodes are disposed, and active chip components are mounted on a second mounting surface opposite the first mounting surface. With this configuration, it is possible to provide a circuit module which is high in density and small in size as compared to a circuit module in which circuit elements are formed on a single-sided mounting board.

SUMMARY

Technical Problems

In the case of applying the circuit module disclosed in WO 2005/078796 to a radio frequency front-end circuit, a semiconductor integrated circuit (IC) embedded with at least one of an amplifier, a control circuit, or a switch is expected to be applied. In such a case, since the semiconductor IC can be reduced in profile, the semiconductor IC is disposed on the first mounting surface facing a motherboard.

However, as recognized by the present inventor, disposing the semiconductor IC on the first mounting surface in the circuit module disclosed in WO 2005/078796 creates a need for a signal line passing through the semiconductor IC, a planar line pattern parallel to the first mounting surface of the core substrate, and an external terminal electrode as the signal line path from the semiconductor IC to the motherboard. In that case, however, since this signal line includes a high-resistance line path that passes only through the planar line pattern, transfer loss of radio frequency signals increases, causing deterioration of signal quality. In addition, when the signal line transfers control signals, the signal quality, such as signal-noise (S/N) ratio, of radio frequency signals deteriorates due to digital noise or power supply noise generated from the above-mentioned line path.

In view of the above circumstance, the present disclosure provides a small-sized radio frequency module and communication device having improvement in the signal quality of radio frequency signals input to and output from a semiconductor IC.

Solutions

A radio frequency module according to an aspect of the present disclosure is a radio frequency module including: a module board including a first principal surface and a second principal surface on opposite sides of the module board; a semiconductor integrated circuit (IC) including a third principal surface and a fourth principal surface on opposite sides of the semiconductor IC; and an external-connection terminal disposed on the second principal surface. In this radio frequency module, the third principal surface faces the second principal surface and is closer to the second principal surface than the fourth principal surface is to the second principal surface, and the semiconductor IC includes: at least one of (i) a control circuit configured to control a radio frequency component using a control signal, (ii) a low noise amplifier configured to amplify a reception signal, or (iii) a switch; and a signal electrode disposed on the fourth principal surface, and via the signal electrode the semiconductor IC is configured to receive or output at least one of a radio frequency signal or the control signal.

Advantageous Effects

According to the present disclosure, it is possible to provide a small-sized radio frequency module and communication device having improvement in the signal quality of radio frequency signals input to and output from a semiconductor IC.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

Figure 1:
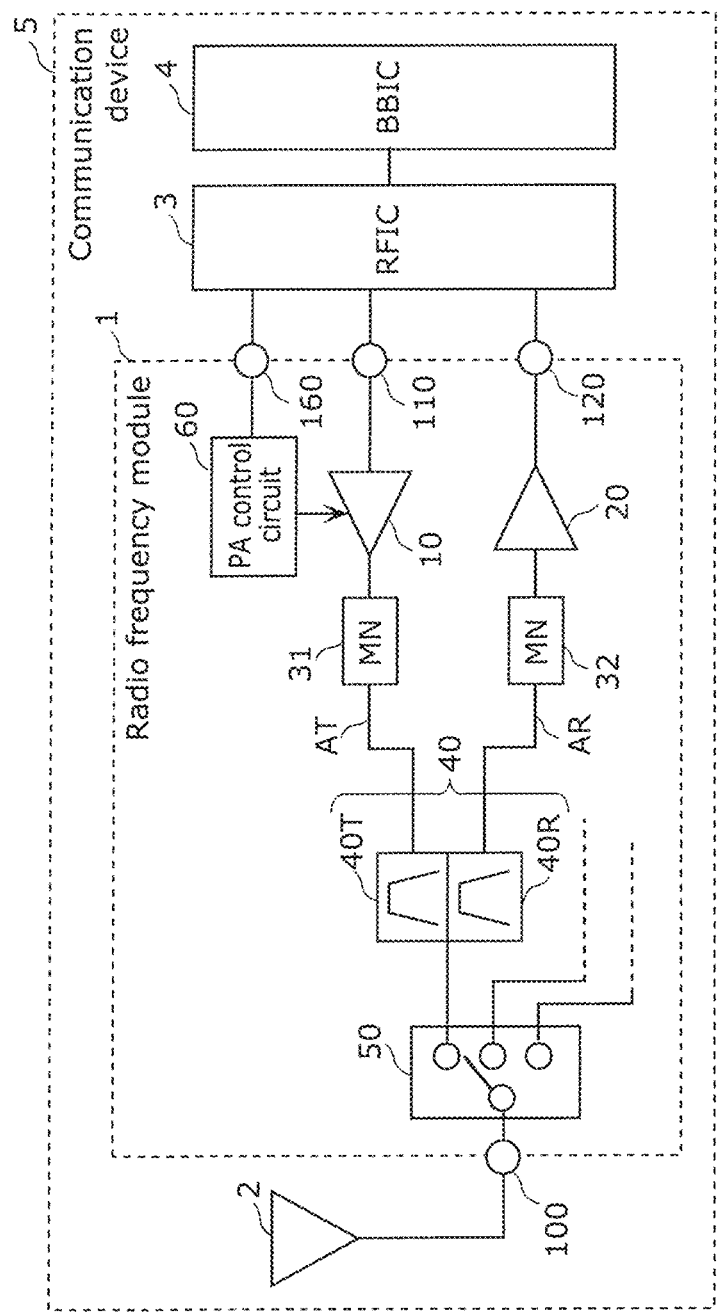
FIG. 1 illustrates a circuit configuration of a radio frequency module and a communication device according to an embodiment.

Hereinafter, embodiments of the present disclosure will be described in detail. Note that the embodiments described below illustrate general or specific examples. The numerical values, shapes, materials, constituent elements, the arrangement and connection of the constituent elements, etc., illustrated in the following embodiments, working examples, and variations are mere examples, and are therefore not intended to limit the present disclosure. Among the constituent elements in the following working examples and variations, constituent elements not recited in the independent claims will be described as optional constituent elements. In addition, the sizes of the constituent elements and the ratios of the sizes illustrated in the drawings are not necessarily precise. In the drawings, essentially the same constituent elements share the same reference signs, and redundant descriptions will be omitted or simplified.

In the following description, value ranges, terms indicating relationships between elements such as "parallel" and "vertical", and terms indicating the shapes of elements such as "quadrilateral" do not have the meanings in the strict sense only, but include essentially equivalent value ranges and meanings, for example deviations of about a few percent.

In the following description, a "transmission path" refers to a transfer path including, for example, a line for propagating radio frequency transmission signals, an electrode directly connected to the line, and a terminal directly connected to the line or the electrode. A "reception path" refers to a transfer path including, for example, a line for propagating radio frequency reception signals, an electrode directly connected to the line, and a terminal directly connected to the line or the electrode.

In addition, in the following description, the expression "A and B are connected" applies not only when A and B are physically connected, but also when A and B are electrically connected.

Embodiment

1. Circuit Configuration of Radio Frequency Module 1 and Communication Device 5

FIG. 1 illustrates a circuit configuration of radio frequency module 1 and communication device 5 according to an embodiment. As illustrated in the figure, communication device 5 includes radio frequency module 1, antenna 2, radio frequency (RF) signal processing circuit (RF integrated circuit (IC)) 3, and baseband signal processing circuit (BBIC) 4. In this exemplary configuration the communication device 5 is a multi-band transceiver. As used in this specification the term "module", as used with "radio frequency module", or "RF front-end module" should be construed as circuitry (programmable, as well as discrete) and associated circuit components, such as circuit boards, RF shielding, etc.

RFIC 3 is an RF signal processing circuit that processes radio frequency signals transmitted or received by antenna 2. Specifically, RFIC 3 processes reception signals input via reception paths of radio frequency module 1 by down-conversion, for example, and outputs resultant reception signals to BBIC 4. RFIC 3 also outputs, to transmission paths of radio frequency module 1, radio frequency transmission signals processed based on a signal input from BBIC 4. In the following, a "transmission path" or "transmission signal path" means a transfer route that includes, for instance, a line through which a radio frequency transmission signal propagates, an electrode directly connected to the line, and a terminal directly connected to the line or the electrode. Further, a "reception path" means a transfer route that includes, for instance, a line through which a radio frequency reception signal propagates, an electrode directly connected to the line, and a terminal directly connected to the line or the electrode. In addition, a "transmission and reception path" means a transfer route that includes, for instance, a line through which a radio frequency transmission signal and a radio frequency reception signal propagate, an electrode directly connected to the line, and a terminal directly connected to the line or the electrode. Furthermore, as used herein the terms "circuit" or "circuitry" means one or more circuits, including discrete circuit(s) as well as circuit board(s) and combinations thereof.

BBIC 4 is a circuit that performs data processing using a signal of a frequency lower than that of a radio frequency signal transferred by radio frequency module 1. The signal processed by BBIC 4 is used as, for example, an image signal for image display, or an audio signal for reproduction by a loudspeaker.

RFIC 3 functions as a controller that controls connection of switch 50 included in radio frequency module 1 based on communication bands (frequency bands) used. Specifically, RFIC 3 switches the connection of switch 50 included in radio frequency module 1 using a control signal (not illustrated). Note that the controller may be provided outside RFIC 3; for example, in radio frequency module 1.

RFIC 3 also functions as a controller that controls the gain of power amplifier 10 included in radio frequency module 1. Specifically, RFIC 3 outputs digital control signals which are in conformity with mobile industry processor interface (MIPI) etc. to radio frequency module 1 via control signal terminal 160. RFIC 3 also outputs, to radio frequency module 1 via control signal terminal 160, direct-current voltage signal VDC for power supply voltage Vcc and bias voltage Vbias which are to be supplied to power amplifier 10. Power amplifier (PA) control circuit 60 of radio frequency module 1 adjusts the gain of power amplifier 10 according to the digital control signal and the direct-current voltage signal received via control signal terminal 160. As such, the PA control circuit may include digital to analog conversion circuitry, or a microprocessor that receives a digital instruction and generates a control signal that adjusts the gain of the power amplifier 10. Note that direct-current voltage signal VDC may be input via a terminal different from control signal terminal 160. The controller may be provided outside RFIC 3; for example in BBIC 4.

Antenna 2 is connected to antenna connection terminal 100 of radio frequency module 1, radiates a radio frequency signal output from radio frequency module 1, receives a radio frequency signal from outside, and outputs the received radio frequency signal to radio frequency module 1.

Note that in communication device 5 according to the present embodiment, antenna 2 and BBIC 4 are optional elements.

Next, a detailed configuration of radio frequency module 1 will be described.

As illustrated in FIG. 1, radio frequency module 1 includes antenna connection terminal 100, transmission input terminal 110, reception output terminal 120, power amplifier 10, control signal terminal 160, PA control circuit 60, low noise amplifier 20, transmission filter 40T, reception filter 40R, matching circuits 31 and 32, and switch 50.

Antenna connection terminal 100 is connected to antenna 2.

Power amplifier 10 amplifies transmission signals of communication band A input via transmission input terminal 110. Power amplifier 10 includes an input terminal connected to transmission input terminal 110, and an output terminal connected to matching circuit 31.

PA control circuit 60 is an example of a control circuit that controls power amplifier 10 using a digital control signal, and adjusts the gain of power amplifier 10 according to digital control signal MIPI and direct-current voltage signal VDC received via control signal terminal 160.

Low noise amplifier 20 amplifies reception signals of communication band A with low noise, and outputs the amplified signals to reception output terminal 120.

Transmission filter 40T is disposed on transmission path AT connecting power amplifier 10 and antenna connection terminal 100, and passes transmission signals in the transmission band of communication band A among transmission signals amplified by power amplifier 10.

Reception filter 40R is disposed on reception path AR connecting low noise amplifier 20 and antenna connection terminal 100, and passes reception signals in the reception band of communication band A among reception signals input via antenna connection terminal 100.

Note that transmission filter 40T and reception filter 40R may each be, but are not limited to, any of an acoustic wave filter that uses surface acoustic waves (SAWs), an acoustic wave filter that uses bulk acoustic waves (BAWs), an inductor-capacitor (LC) resonance filter, and a dielectric filter, for example.

Transmission filter 40T and reception filter 40R constitute duplexer 40 having communication band A as the passband.

Matching circuit 31 is an example of a first impedance matching circuit. Matching circuit 31 is connected to the output terminal of power amplifier 10, and matches the impedances of power amplifier 10 and transmission filter 40T. Matching circuit 31 includes at least one of an inductor or a capacitor.

Matching circuit 32 is an example of a second impedance matching circuit. Matching circuit 32 is connected to the input terminal of low noise amplifier 20, and matches the impedances of low noise amplifier 20 and reception filter 40R. Matching circuit 32 includes at least one of an inductor or a capacitor.

Switch 50 is an example of an antenna switch. Switch 50 is connected to antenna connection terminal 100, and switches between (1) connection of antenna connection terminal 100 to transmission path AT and reception path AR and (2) connection of antenna connection terminal 100 to another transmission path and reception path. Note that switch 50 may be a multiple-connection switch circuit capable of simultaneously establishing the connections (1) and (2) described above.

Note that an additional impedance matching circuit, filter, switch, etc. may be disposed on each signal path included in radio frequency module 1.

In the above configuration of radio frequency module 1, power amplifier 10, matching circuit 31, transmission filter 40T, and switch 50 are included in a transmitter circuit that transfers transmission signals of communication band A to antenna connection terminal 100. Switch 50, reception filter 40R, matching circuit 32, and low noise amplifier 20 are included in a receiver circuit that transfers reception signals of communication band A from antenna 2 via antenna connection terminal 100.

With the above circuit configuration, radio frequency module 1 can perform at least one of transmission or reception of radio frequency signals of communication band A.

Note that, in addition to the above transmitter circuit and receiver circuit, radio frequency module 1 may include a transmitter circuit that transfers transmission signals of a communication band different from communication band A and a receiver circuit that transfers reception signals of a communication band different from communication band A. In radio frequency module 1, the above transmitter circuit and receiver circuit need not be connected to antenna connection terminal 100 via switch 50.

Power amplifier 10 and low noise amplifiers 20 are each configured with, for example, a field-effect transistor (FET) or a hetero-junction bipolar transistor (HBT) including, for instance, a Si-based complementary metal oxide semiconductor (CMOS) or GaAs.

At least one of low noise amplifier 20, switch 50, and PA control circuit 60 may be formed in a semiconductor integrated circuit (IC). The semiconductor IC may further include power amplifier 10. The semiconductor IC includes a complementary metal oxide semiconductor (CMOS), for example. Specifically, the semiconductor IC is formed by a silicon on insulator (SOI) process. This way, the semiconductor IC can be manufactured at low cost. Note that the semiconductor IC may include at least one of GaAs, SiGe, or GaN. Accordingly, radio frequency signals having high-quality amplification properties and noise properties can be output.

In radio frequency module 1 according to the present embodiment, transmission filter 40T and reception filter 40R constitute duplexer 40 that transfers transmission signals and reception signals by frequency division duplexing (FDD). The transmission signals and reception signals, however, may be transferred by time division duplexing (TDD). In that case, a switch for switching between transmission and reception is disposed in at least one of the preceding stage or the subsequent stage of transmission filter 40T and reception filter 40R.

Note that it is sufficient so long as the radio frequency module according to the present disclosure includes a semiconductor IC including at least one of low noise amplifier 20, switch 50, or PA control circuit 60 among the circuit components of radio frequency module 1 described above, and the other circuit components are optional.

Here, in the case of mounting each circuit element included in radio frequency module 1 on a single module board as a small-sized front-end circuit, it is necessary to reduce the layout area of circuit components on the module board surface. In such a case, a semiconductor IC embedded with at least one of low noise amplifier 20, PA control circuit 60, or switch 50 is expected to be applied. Since the semiconductor IC can be reduced in profile, it is desirably disposed on, of a first mounting surface and a second mounting surface of the module board, the first mounting surface facing the motherboard.

Disposing the semiconductor IC on the first mounting surface, however, creates a need for a signal line passing through the semiconductor IC, a planar line pattern parallel to the first mounting surface of the module board, and an external-connection terminal as a signal transfer path from the semiconductor IC to the motherboard. In that case, however, this signal line includes a low-resistance via line provided along the direction perpendicular to the first mounting surface and a high-resistance line path passing only through the planar line pattern. Consequently, the resistance in the line path increases, causing an increase in transfer loss of radio frequency signals transferred between the motherboard and the semiconductor IC. In addition, when the signal line transfers control signals for controlling the semiconductor IC, the signal quality, such as the S/N ratio, of radio frequency signals passing through the semiconductor IC deteriorates due to digital noise or power supply noise of control signals generated from the high-resistance line path passing only through the planar line pattern.

To address this, radio frequency module 1 according to the present embodiment has a configuration in which radio frequency signals or control signals can be transferred between the motherboard and the semiconductor IC without passing through the planar line pattern of the module board. Such a configuration of radio frequency module 1 will be described below.

2. Arrangement of Circuit Elements of Radio Frequency Module 1A According to Working Example 1

Figure 2A:
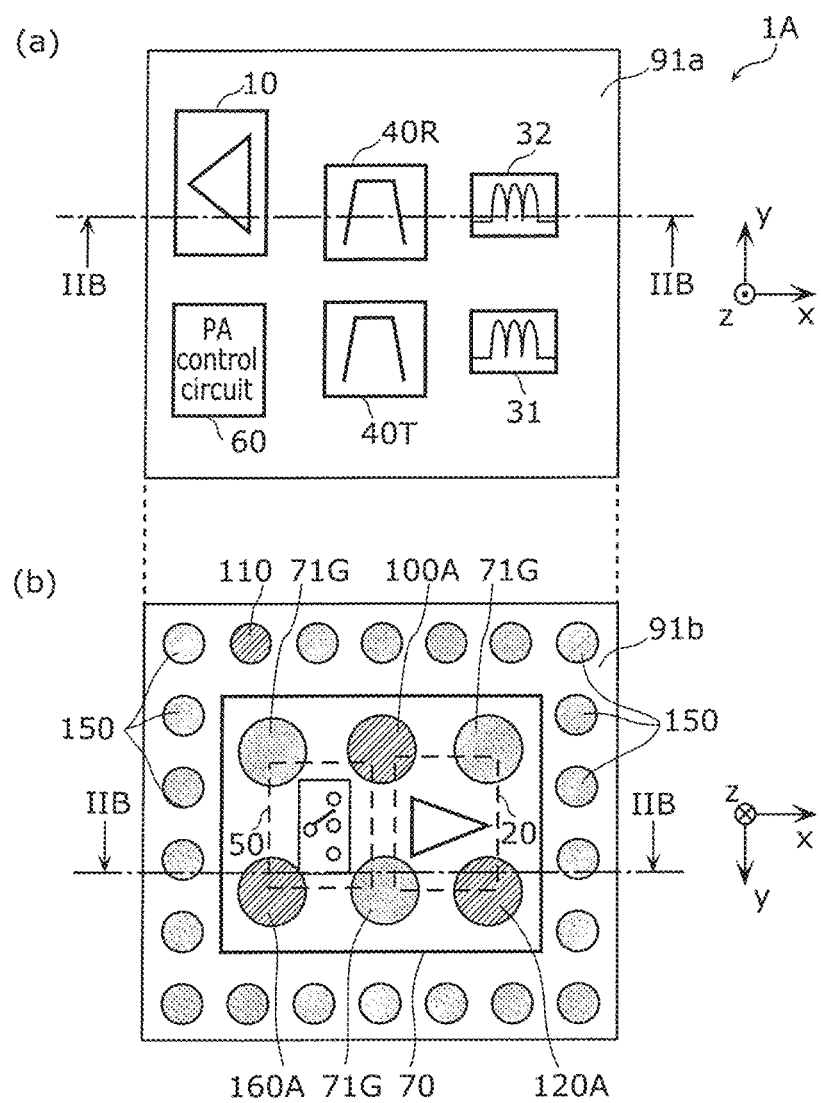
FIG. 2A is a schematic diagram illustrating a plan view configuration of a radio frequency module (or RF front-end circuitry) according to Working Example 1.
Figure 2B:
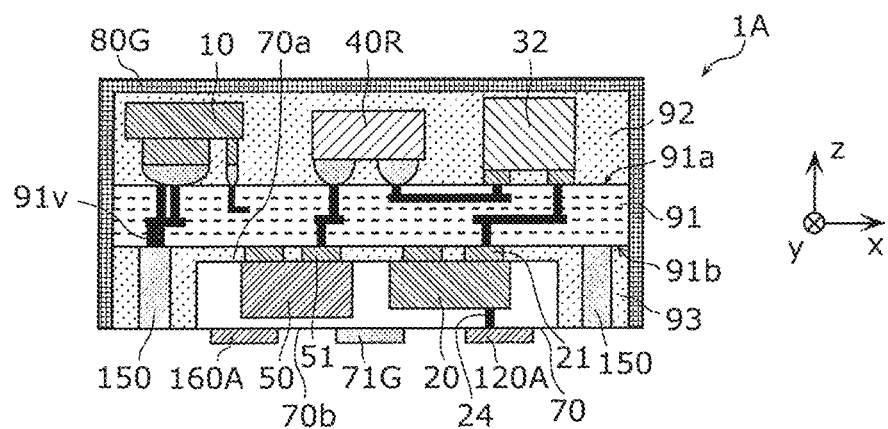
FIG. 2B is a schematic diagram illustrating a cross-sectional configuration of the radio frequency module according to Working Example 1.

FIG. 2A is a schematic diagram illustrating a plan view configuration of radio frequency module 1A according to Working Example 1. FIG. 2B is a schematic diagram illustrating a cross-sectional configuration of radio frequency module 1A according to Working Example 1, and is specifically a cross-sectional view taken at line IIB-IIB in FIG. 2A. Note that part (a) of FIG. 2A illustrates how circuit elements are arranged when, of principal surfaces 91a and 91b located on opposite sides of module board 91, principal surface 91a is viewed from the z-axis positive side. Part (b) of FIG. 2A illustrates how circuit elements are arranged when principal surface 91b is viewed from the z-axis negative side.

Radio frequency module 1A according to the working example is to specifically show an arrangement of circuit elements included in radio frequency module 1 according to the embodiment illustrated in FIG. 1.

As illustrated in FIG. 2A and FIG. 2B, radio frequency module 1A according to the present working example includes module board 91, resin components 92 and 93, and external-connection terminals 150 in addition to the circuit configuration illustrated in FIG. 1.

Module board 91 includes principal surface 91a (a first principal surface) and principal surface 91b (a second principal surface) on opposite sides of module board 91, and is a board on which the above-described transmitter circuit and receiver circuit are mounted. Examples of the board used for module board 91 include a low temperature co-fired ceramics (LTCC) board having a configuration in which a plurality of dielectric layers are laminated, a high temperature co-fired ceramics (HTCC) board, a component-embedded board, a board having a redistribution layer (RDL), and a printed circuit board.

Resin component 92 is disposed on principal surface 91a of module board 91, and covers part of the transmitter circuit, part of the receiver circuit, and principal surface 91a of module board 91. Resin component 92 has a function to ensure the reliability of circuit elements included in the transmitter circuit and receiver circuit, such as the mechanical strength and moisture resistance. Resin component 93 is disposed on principal surface 91b of module board 91, and covers part of the transmitter circuit, part of the receiver circuit, and principal surface 91b of module board 91. Resin component 93 has a function to ensure the reliability of circuit elements included in the transmitter circuit and receiver circuit, such as the mechanical strength and moisture resistance. Note that resin components 92 and 93 are optional elements of the radio frequency module according to the present disclosure.

External-connection terminals 150 are disposed on principal surface 91b. Radio frequency module 1A transmits and receives, via the plurality of external-connection terminals 150, electric signals to and from a motherboard that is disposed on the z-axis negative side of radio frequency module 1A. Some of external-connection terminals 150 are set to the ground potential of the motherboard.

Of principal surfaces 91a and 91b, semiconductor IC 70 including low noise amplifier 20 and switch 50 that can be readily reduced in profile is disposed on principal surface 91b facing the motherboard. Therefore, radio frequency module 1A can be reduced in profile as a whole. Moreover, since a plurality of external-connection terminals 150 applied as ground electrodes are disposed in the outer periphery of low noise amplifier 20 having a significant impact on the reception sensitivity of the receiver circuit, it is possible to reduce deterioration of the reception sensitivity of the receiver circuit.

Semiconductor IC 70 includes principal surface 70a (a third principal surface) and principal surface 70b (a fourth principal surface) on opposite sides of semiconductor IC 70. Note that semiconductor IC 70 in the present working example includes low noise amplifier 20 and switch 50; however, semiconductor IC 70 is not limited to this example. It is sufficient so long as semiconductor IC 70 according to the present disclosure includes at least one of low noise amplifier 20, switch 50, or a control circuit that controls a radio frequency component using a control signal. The control circuit that controls a radio frequency component using a control signal may be PA control circuit 60, or may be a control circuit that controls at least one of low noise amplifier 20 or switch 50.

Semiconductor IC 70 is disposed on principal surface 91b so that principal surface 70a faces principal surface 91b and is closer to principal surface 91b than principal surface 70b is to principal surface 91b. That is to say, principal surface 70a faces principal surface 91b, and principal surface 70b faces the motherboard.

Semiconductor IC 70 further includes signal electrodes 100A, 120A, and 160A formed on principal surface 70b. Signal electrode 100A corresponds to antenna connection terminal 100 illustrated in FIG. 1. Signal electrode 120A corresponds to reception output terminal 120 illustrated in FIG. 1. Signal electrode 160A corresponds to control signal terminal 160 illustrated in FIG. 1. Note that it is sufficient so long as at least one of signal electrode 100A, 120A, or 160A is formed on principal surface 70b.

With the above configuration, since semiconductor IC 70 that can be readily reduced in profile is disposed on principal surface 91b facing the motherboard, it is possible to reduce the size of radio frequency module 1A. The signal transfer path from semiconductor IC 70 to the motherboard is not a signal line passing through semiconductor IC 70, a planar line pattern parallel to principal surface 91b of module board 91, and external-connection terminal 150, but is a signal path passing only through signal electrodes 100A, 120A, and 160A formed on principal surface 70b of semiconductor IC 70. Thus, the radio frequency signals input to and output from semiconductor IC 70 can be transferred between the motherboard and semiconductor IC 70 by passing only though the low-resistance line path, thereby enabling reduction of transfer loss of the radio frequency signals. Moreover, since a line for transferring the radio frequency signals need not be formed between semiconductor IC 70 and external-connection terminal 150, it is possible to save the surface area of principal surface 91b. In other words, it is possible to provide small-sized radio frequency module 1A having improvement in the signal quality of radio frequency signals input to and output from semiconductor IC 70.

Semiconductor IC 70 may further include ground electrode 71G formed on principal surface 70*b*.

This enables reduction of the total number of external-connection terminals 150 set to the ground potential, and thus, the surface area of principal surface 91*b* can be saved. Moreover, disposing ground electrodes 71G between signal electrodes 100A, 120A, and 160A as illustrated in part (b) of FIG. 2A enables improvement in isolation between switch 50, low noise amplifier 20, and PA control circuit 60.

Signal electrode 120A formed on principal surface 70*b* may be connected to via conductor 24 formed in semiconductor IC 70.

With this configuration, radio frequency signals input to and output from semiconductor IC 70 are connected to signal electrode 120A through via conductor 24 of low resistance, and therefore, transfer loss of the radio frequency signals can be further reduced.

In the present working example, semiconductor IC 70 includes low noise amplifier 20, the output terminal of low noise amplifier 20 is connected to reception output terminal 120, and signal electrode 120A is reception output terminal 120.

Accordingly, reception signals amplified by low noise amplifier 20 can be transferred to the motherboard with low loss.

Furthermore, in the present working example, semiconductor IC 70 includes switch 50, switch 50 includes a common terminal and a plurality of selection terminals, the common terminal is connected to antenna connection terminal 100, and signal electrode 100A is antenna connection terminal 100.

Accordingly, transmission signals which are to be output via antenna connection terminal 100 can be transferred to the motherboard with low loss, and reception signals input to antenna connection terminal 100 from the motherboard can be transferred with low loss.

In semiconductor IC 70, low noise amplifier 20 is connected to matching circuit 32 via electrode 21 formed on principal surface 70*a* and a line formed in module board 91. Further, switch 50 is connected to reception filter 40R via electrode 51 formed on principal surface 70*a* and a line formed in module board 91.

As illustrated in FIG. 2A and FIG. 2B, in radio frequency module 1A according to the present working example, power amplifier 10, PA control circuit 60, transmission filter 40T, reception filter 40R, and matching circuits 31 and 32 are surface-mounted on principal surface 91*a* (the first principal surface) of module board 91. Low noise amplifier 20 and switch 50 are surface-mounted on principal surface 91*b* (the second principal surface) of module board 91.

Here, in a plan view of module board 91, it is desirable that a footprint of low noise amplifier 20 overlap with a footprint of matching circuit 32 at least partially, and a footprint of switch 50 overlap with a footprint of reception filter 40R at least partially.

This configuration makes it possible to shorten the line connecting low noise amplifier 20 and matching circuit 32 and shorten the line connecting switch 50 and reception filter 40R, thus enabling reduction of transfer loss of reception signals transferred by radio frequency module 1A.

In radio frequency module 1A according to the present working example, power amplifier 10 is mounted on principal surface 91*a* (the first principal surface).

Among the circuit components included in radio frequency module 1A, power amplifier 10 is a component that generates a large amount of heat. To improve the heat dissipation of radio frequency module 1A, it is important to dissipate heat generated by power amplifier 10 to the motherboard via a heat dissipation path having low thermal resistance. If power amplifier 10 is mounted on principal surface 91*b*, an electrode line connected to power amplifier 10 is disposed on principal surface 91*b*. Thus, the heat dissipation path in such a case includes a heat dissipation path passing only through a planar line pattern provided on principal surface 91*b* (along the xy plane direction). Since this planar line pattern is formed with a thin metal film, the thermal resistance is high. Consequently, the heat dissipation deteriorates if power amplifier 10 is disposed on principal surface 91*b*.

In contrast, when power amplifier 10 is mounted on principal surface 91*a*, power amplifier 10 and external-connection terminal 150 can be connected through penetrating via conductor 91*v* that penetrates through module board 91 between principal surface 91*a* and principal surface 91*b* as illustrated in FIG. 2B. Thus, the heat dissipation path of power amplifier 10 can be other than a heat dissipation path that passes only through, among the lines provided in module board 91, a planar line pattern of high thermal resistance provided along the xy plane direction. Accordingly, it is possible to provide radio frequency module 1A having improvement in heat dissipation from power amplifier 10 to the motherboard.

Transmission input terminal 110 may be disposed in the edge region of principal surface 91*b* as illustrated in FIG. 2A.

Note that from the viewpoint of heat dissipation, it is desirable that penetrating via conductor 91*v* or a heat dissipation component be disposed in a region of principal surface 91*b* facing the region of principal surface 91*a* in which power amplifier 10 is disposed. Thus, it is desirable that no circuit elements be disposed in that region of principal surface 91*b*.

In the present working example, power amplifier 10 is disposed on principal surface 91*a*, and low noise amplifier 20 is disposed on principal surface 91*b*. With this configuration, since power amplifier 10 and low noise amplifier 20 are disposed with module board 91 interposed therebetween, it is possible to improve isolation between transmission signals and reception signals.

As illustrated in FIG. 2B, radio frequency module 1A may further include shield electrode layer 80G that covers the upper surface and side surfaces of resin component 92 and the side surfaces of resin component 93, and is set to the ground potential.

This improves the electromagnetic-field shielding function of radio frequency module 1A with respect to an external circuit.

Figure 2C:
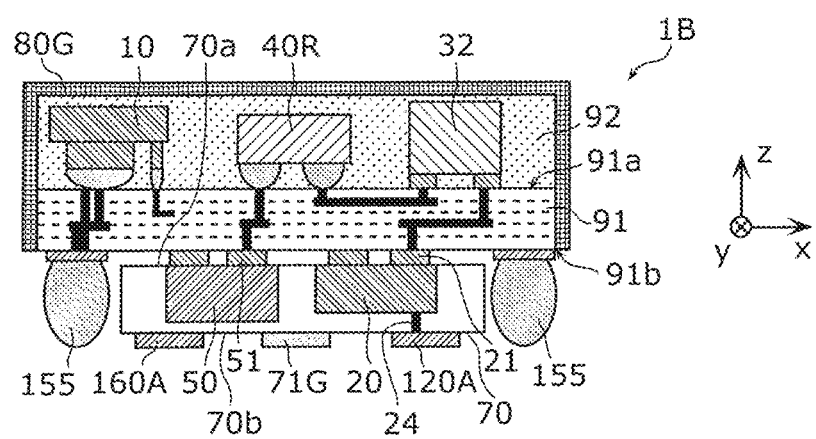
FIG. 2C is a schematic diagram illustrating a cross-sectional configuration of a radio frequency module according to a variation.

Note that external-connection terminals 150 may be columnar electrodes penetrating through resin component 93 in the z-axis direction as illustrated in FIG. 2A and FIG. 2B, or may be bump electrodes 155 formed on principal surface 91*b* as illustrated in FIG. 2C. As illustrated in FIG. 2C, resin component 93 is not disposed on principal surface 91*b* when external-connection terminals 150 are bump electrodes 155.

In radio frequency module 1A according to the present working example, external-connection terminals 150 may be disposed on principal surface 91*a*.

3. Arrangement of Circuit Elements of Radio Frequency Module 1C According to Working Example 2

Figure 3A:
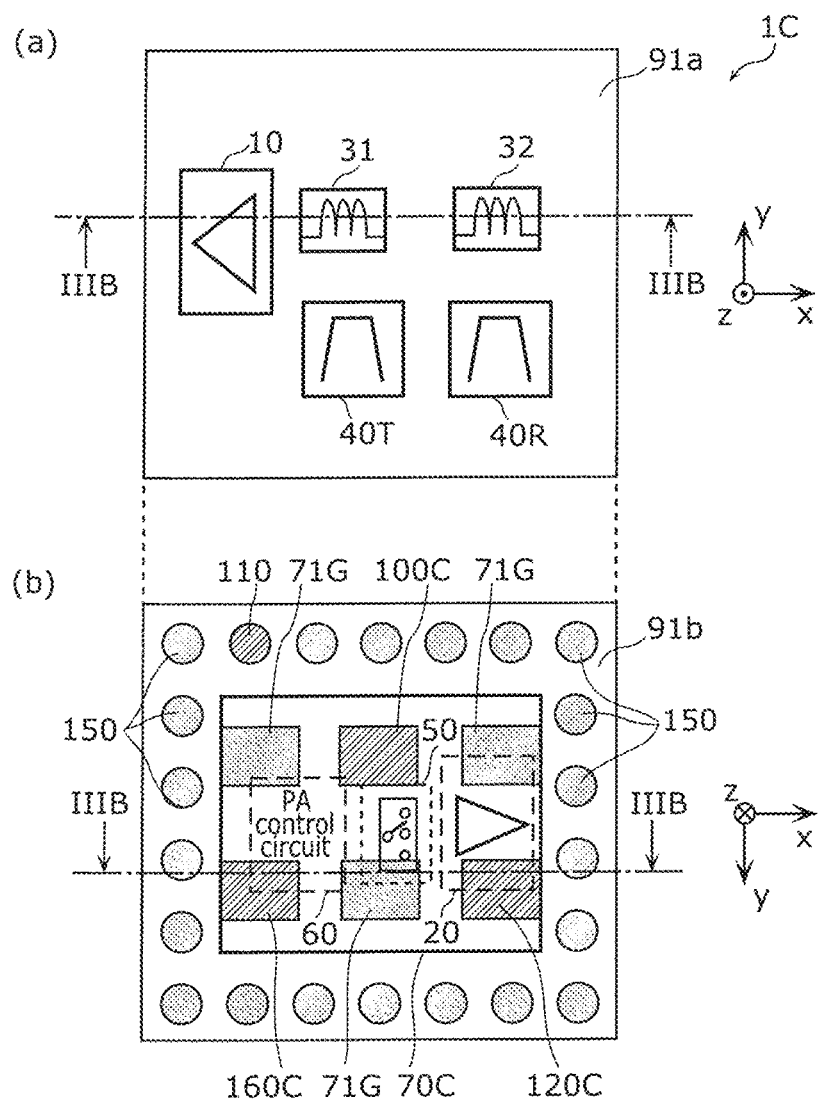
FIG. 3A is a schematic diagram illustrating a plan view configuration of a radio frequency module according to Working Example 2.
Figure 3B:
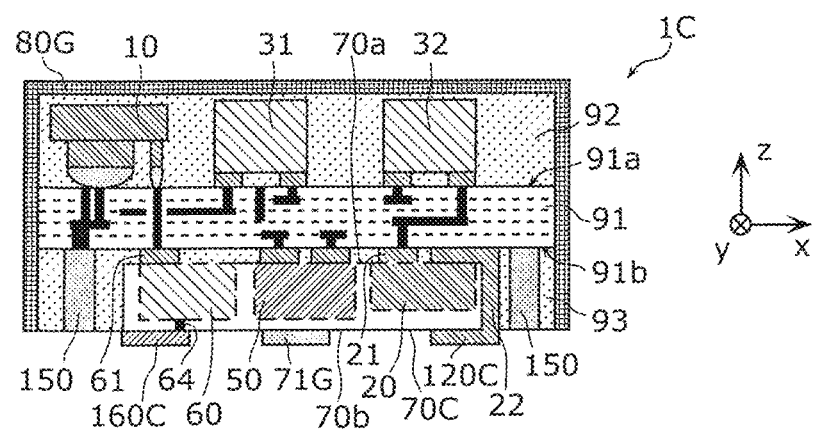
FIG. 3B is a schematic diagram illustrating a cross-sectional configuration of the radio frequency module according to Working Example 2.

FIG. 3A is a schematic diagram illustrating a plan view configuration of radio frequency module 1C according to Working Example 2. FIG. 3B is a schematic diagram illustrating a cross-sectional configuration of radio frequency module 1C according to Working Example 2, and is specifically a cross-sectional view taken at line IIIB-IIIB in FIG. 3A. Note that part (a) of FIG. 3A illustrates how circuit elements are arranged when, of principal surfaces 91a and 91b located on opposite sides of module board 91, principal surface 91a is viewed from the z-axis positive side. Part (b) of FIG. 3A is a perspective view illustrating how circuit elements are arranged when principal surface 91b is viewed from the z-axis negative side.

Radio frequency module 1C according to Working Example 2 is to specifically show an arrangement of circuit elements included in radio frequency module 1 according to the embodiment illustrated in FIG. 1.

Radio frequency module 1C according to the present working example is different from radio frequency module 1A according to Working Example 1 in arrangement of PA control circuit 60 and electrodes of semiconductor IC 70C. Hereinafter, radio frequency module 1C according to the present working example will be described, focusing on the aspects different from radio frequency module 1A according to Working Example 1 and omitting the description of the aspects identical to radio frequency module 1A.

Module board 91 includes principal surface 91a (the first principal surface) and principal surface 91b (the second principal surface) on opposite sides of module board 91, and is a board on which the above-described transmitter circuit and receiver circuit are mounted. Examples of the board used for module board 91 include an LTCC board having a configuration in which a plurality of dielectric layers are laminated, an HTCC board, a component-embedded board, a board having an RDL, and a printed circuit board.

Of principal surfaces 91a and 91b, semiconductor IC 70C including low noise amplifier 20, switch 50, and PA control circuit 60 that can be readily reduced in profile is disposed on principal surface 91b facing the motherboard. Therefore, radio frequency module 1C can be reduced in profile as a whole. Further, since a plurality of external-connection terminals 150 applied as ground electrodes are disposed in the outer periphery of low noise amplifier 20 having a significant impact on the reception sensitivity of the receiver circuit, it is possible to reduce deterioration of the reception sensitivity of the receiver circuit. Furthermore, since a plurality of external-connection terminals 150 applied as ground electrodes are disposed in the outer periphery of PA control circuit 60, it is possible to inhibit digital noise and power supply noise from flowing out into the circuit components disposed on principal surface 91a and the external circuit provided in the vicinity of radio frequency module 1C.

Semiconductor IC 70C includes principal surface 70a (the third principal surface) and principal surface 70b (the fourth principal surface) on opposite sides of semiconductor IC 70C. In the present working example, semiconductor IC 70C includes low noise amplifier 20, switch 50, and PA control circuit 60. Note that semiconductor IC 70C is not limited to this, and it is sufficient so long as semiconductor IC 70C includes at least PA control circuit 60. PA control circuit 60 need not be a control circuit that controls power amplifier 10, and may be a control circuit that controls a radio frequency component using a control signal.

Semiconductor IC 70C is disposed on principal surface 91b so that principal surface 70a faces principal surface 91b and is closer to principal surface 91b than principal surface 70b is to principal surface 91b. That is to say, principal surface 70a faces principal surface 91b, and principal surface 70b faces the motherboard.

Semiconductor IC 70C further includes signal electrodes 100C, 120C, and 160C formed on principal surface 70b. Signal electrode 100C corresponds to antenna connection terminal 100 illustrated in FIG. 1. Signal electrode 120C corresponds to reception output terminal 120 illustrated in FIG. 1. Signal electrode 160C corresponds to control signal terminal 160 illustrated in FIG. 1. PA control circuit 60 includes an input terminal and an output terminal, and receives, via the input terminal through signal electrode 160C and via conductor 64, a first control signal output from RFIC 3 provided on the motherboard, for example. PA control circuit 60 then outputs a second control signal such as a digital control signal and direct-current voltage signal VDC to power amplifier 10 via the output terminal based on the first control signal. In other words, control signal terminal 160 corresponds to the input terminal of PA control circuit 60.

Note that in the present working example, it is sufficient so long as at least signal electrode 160C out of signal electrodes 100C, 120C, and 160C is formed on principal surface 70b.

With the above configuration, since semiconductor IC 70C that can be readily reduced in profile is disposed on principal surface 91b facing the motherboard, it is possible to reduce the size of radio frequency module 1C. The signal transfer path from semiconductor IC 70C to the motherboard is not a signal line passing through semiconductor IC 70C, a planar line pattern parallel to principal surface 91b of module board 91, and external-connection terminal 150, but is a signal path passing only through signal electrodes 100C, 120C, and 160C formed on principal surface 70b of semiconductor IC 70C. Thus, the radio frequency signals input to and output from semiconductor IC 70C can be transferred between the motherboard and semiconductor IC 70C by passing only though the low-resistance line path, thereby enabling reduction of transfer loss of the radio frequency signals. Moreover, since a line for transferring the radio frequency signals need not be formed between semiconductor IC 70C and external-connection terminal 150, it is possible to save the surface area of principal surface 91b. In other words, it is possible to provide small-sized radio frequency module 1C having improvement in the signal quality of radio frequency signals input to and output from semiconductor IC 70C.

Semiconductor IC 70C may further include ground electrode 71G formed on principal surface 70b.

This enables reduction of the total number of external-connection terminals 150 set to the ground potential, and thus, the surface area of principal surface 91b can be saved. Moreover, disposing ground electrodes 71G between signal electrodes 100C, 120C, and 160C as illustrated in part (b) of FIG. 3A enables improvement in isolation between switch 50, low noise amplifier 20, and PA control circuit 60.

Signal electrode 120C formed on principal surface 70b is connected to side surface electrode 22 formed on a side surface of semiconductor IC 70C. Side surface electrode 22 is connected to a signal electrode formed on principal surface 70a. That is to say, signal electrode 120C is connected to the signal electrode formed on principal surface 70a via side surface electrode 22.

With this configuration, the radio frequency signals output from semiconductor IC 70C are output to the motherboard by passing, not through the inside of semiconductor IC 70C from the signal electrode formed on principal surface 70a, but through the side surface of semiconductor IC 70C and signal electrode 120C, and thus, it is possible to reduce the size of semiconductor IC 70C.

Note that, not only signal electrode 120C but also signal electrodes 100C and 160C may also be connected to a signal electrode formed on principal surface 70a via the side surface electrode.

Low noise amplifier 20 and matching circuit 32 are connected via electrode 21 formed on principal surface 70a of semiconductor IC 70C and a line formed in module board 91. Further, PA control circuit 60 and power amplifier 10 are connected via electrode 61 formed on principal surface 70a and a line formed in module board 91.

As illustrated in FIG. 3A and FIG. 3B, in radio frequency module 1C according to the present working example, power amplifier 10, transmission filter 40T, reception filter 40R, and matching circuits 31 and 32 are surface-mounted on principal surface 91a (the first principal surface) of module board 91. Low noise amplifier 20, switch 50, and PA control circuit 60 are surface-mounted on principal surface 91b (the second principal surface) of module board 91.

In radio frequency module 1C according to the present working example, power amplifier 10 is mounted on principal surface 91a (the first principal surface).

With this configuration, the heat dissipation path of power amplifier 10 can be other than a heat dissipation path that passes only through, among the lines provided in module board 91, a planar line pattern of high thermal resistance provided along the xy plane direction. Accordingly, it is possible to provide radio frequency module 1C having improvement in heat dissipation from power amplifier 10 to the motherboard. Note that from the viewpoint of heat dissipation, it is desirable that a heat dissipation component be disposed in a region of principal surface 91b facing the region of principal surface 91a in which power amplifier 10 is disposed. Thus, it is desirable that no circuit elements be disposed in that region of principal surface 91b.

Furthermore, as illustrated in FIG. 3A, in a plan view of module board 91, it is desirable that a footprint of PA control circuit 60 overlap with a footprint of matching circuit 31 at least partially, and that power amplifier 10 and matching circuit 31 be disposed next to each other.

This configuration makes it possible to shorten the line connecting power amplifier 10 and matching circuit 31, thus enabling reduction of transfer loss of transmission signals transferred by radio frequency module 1C. Furthermore, since a control line connecting power amplifier 10 and PA control circuit 60 can be shortened while securing the heat dissipation region of power amplifier 10, it is possible to inhibit digital noise and power supply noise from flowing out from the control line.

In the present working example, power amplifier 10 is disposed on principal surface 91a, and low noise amplifier 20 is disposed on principal surface 91b. With this configuration, since power amplifier 10 and low noise amplifier 20 are disposed with module board 91 interposed therebetween, it is possible to improve isolation between transmission signals and reception signals.

In radio frequency module 1C according to the present working example, external-connection terminals 150 may be disposed on principal surface 91a.

4. Arrangement of Circuit Elements of Radio Frequency Module 1D According to Working Example 3

Figure 4A:
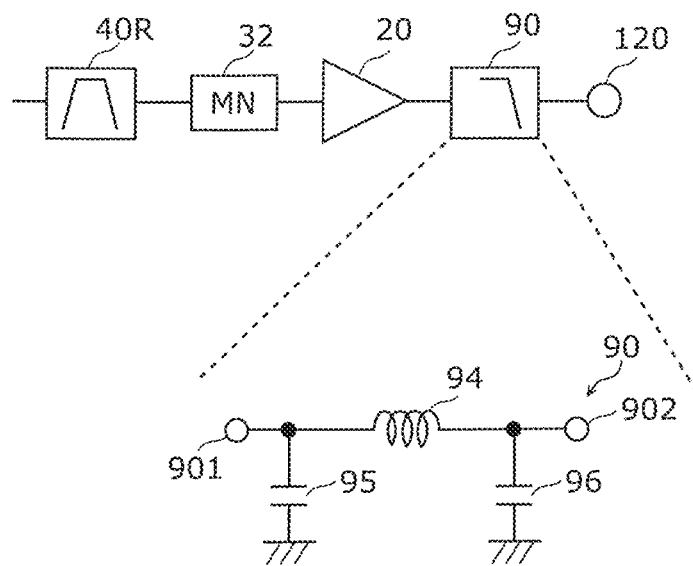
FIG. 4A is a circuit diagram illustrating part of a circuit configuration of a radio frequency module according to Working Example 3.
Figure 4B:
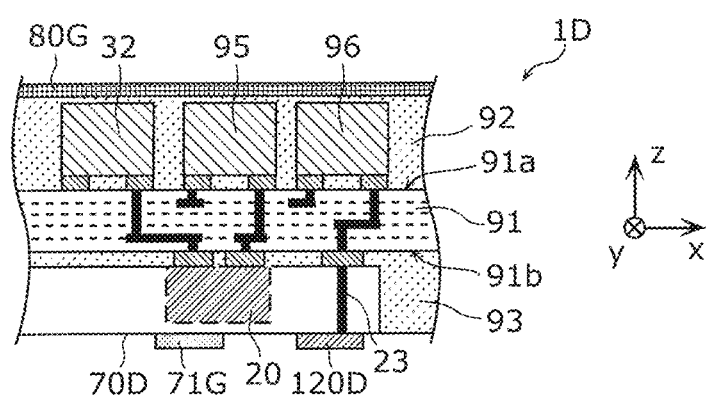
FIG. 4B is a schematic diagram illustrating a cross-sectional configuration of the radio frequency module according to Working Example 3.

FIG. 4A is a circuit diagram illustrating part of a circuit configuration of radio frequency module 1D according to Working Example 3. FIG. 4B is a schematic diagram illustrating a cross-sectional configuration of radio frequency module 1D according to Working Example 3. Specifically, FIG. 4A illustrates a circuit configuration of the reception path only of radio frequency module 1D. FIG. 4B illustrates a cross-sectional configuration of circuit components disposed on the reception path of radio frequency module 1D.

Radio frequency module 1D according to Working Example 3 is to specifically show an arrangement of circuit elements included in radio frequency module 1 according to the embodiment illustrated in FIG. 1.

Radio frequency module 1D according to the present working example is different from radio frequency module 1 according to the embodiment in that filter 90 is disposed, and also different from radio frequency module 1A according to Working Example 1 in arrangement of circuit components disposed on the reception path. Hereinafter, radio frequency module 1D according to the present working example will be described, focusing on the aspects different from radio frequency module 1A according to Working Example 1 and omitting the description of the aspects identical to radio frequency module 1A.

Radio frequency module 1D includes antenna connection terminal 100 (not illustrated in FIG. 4A), transmission input terminal 110 (not illustrated in FIG. 4A), reception output terminal 120, power amplifier 10 (not illustrated in FIG. 4A), control signal terminal 160 (not illustrated in FIG. 4A), PA control circuit 60 (not illustrated in FIG. 4A), low noise amplifier 20, transmission filter 40T (not illustrated in FIG. 4A), reception filter 40R, filter 90, matching circuits 31 (not illustrated in FIG. 4A) and 32, and switch 50 (not illustrated in FIG. 4A).

As illustrated in FIG. 4A, in radio frequency module 1D, filter 90 is connected between low noise amplifier 20 and reception output terminal 120.

Filter 90 is, for example, a low-pass filter having the reception band of communication band A as the passband, and includes inductor 94 and capacitors 95 and 96. Inductor 94 is disposed in series on a path connecting input terminal 901 and output terminal 902. Capacitor 95 is disposed between the ground and a node on a path connecting input terminal 901 and inductor 94. Capacitor 96 is disposed between the ground and a node on a path connecting output terminal 902 and inductor 94.

In radio frequency module 1D having the above circuit configuration, semiconductor IC 70D that includes low noise amplifier 20 is disposed on principal surface 91b of module board 91 as illustrated in FIG. 4B. Matching circuit 32, capacitors 95 and 96, and inductor 94 (not illustrated in FIG. 4B) are disposed on principal surface 91a of module board 91. Matching circuit 32 is connected to the input terminal of low noise amplifier 20 via an electrode formed on module board 91 and a line formed in module board 91. The output terminal of low noise amplifier 20 is connected to capacitor 95 via an electrode formed on module board 91 and a line formed in module board 91. Capacitor 95 is further connected to inductor 94 and capacitor 96 (not illustrated in FIG. 4B). Capacitor 96 is further connected to signal electrode 120D formed on principal surface 70b of semiconductor IC 70D via an electrode formed on module board 91 and a line formed in module board 91 and penetrating via conductor 23 formed in semiconductor IC 70D. That is to say, penetrating via conductor 23 forms a bypass path that is not for transferring signals processed in semiconductor IC 70D but for passing signals transferred between the motherboard and the circuit components included in radio frequency module 1D other than semiconductor IC 70D. Signal electrode 120D corresponds to reception output terminal 120 illustrated in FIG. 4A.

With the above configuration, since semiconductor IC 70D that can be readily reduced in profile is disposed on principal surface 91b facing the motherboard, it is possible to reduce the size of radio frequency module 1D. Penetrating via conductor 23 formed in semiconductor IC 70D is used as a signal transfer path from radio frequency module 1D to the motherboard. That is to say, radio frequency signals transferred between radio frequency module 1D and the motherboard can pass through penetrating via conductor 23, and need not pass through external-connection terminal 150 disposed on principal surface 91b. This means that external-connection terminal 150 for transferring the radio frequency signals is no longer required, and thus, the surface area of principal surface 91b can be saved. In other words, it is possible to provide small-sized radio frequency module 1D.

5. Advantageous Effects Etc.

Radio frequency module 1 includes: module board 91 including principal surfaces 91a and 91b on opposite sides of module board 91; semiconductor IC 70 including principal surfaces 70a and 70b on opposite sides of semiconductor IC 70; and external-connection terminal 150 disposed on principal surface 91b. In radio frequency module 1, principal surface 70a faces principal surface 91b and is closer to principal surface 91b than principal surface 70b is to principal surface 91b, and semiconductor IC 70 includes: at least one of (i) PA control circuit 60 configured to control a radio frequency component using a control signal, (ii) low noise amplifier 20 configured to amplify a reception signal, or (iii) switch 50; and signal electrodes 100A, 120A, and 160A which are on principal surface 70b and via which semiconductor IC 70 is configured to receive or output at least one of a radio frequency signal or the control signal.

With the above configuration, since semiconductor IC 70 that can be readily reduced in profile is disposed on principal surface 91b facing the motherboard, it is possible to reduce the size of radio frequency module 1. The signal transfer path from semiconductor IC 70 to the motherboard is not a signal line passing through semiconductor IC 70, a planar line pattern parallel to principal surface 91b, and external-connection terminal 150, but is a signal path passing only through signal electrodes 100A, 120A, and 160A formed on principal surface 70b. Thus, the radio frequency signals input to and output from semiconductor IC 70 can be transferred between the motherboard and semiconductor IC 70 by passing only though the low-resistance line path, thereby enabling reduction of transfer loss of the radio frequency signals. Moreover, since a line for transferring the radio frequency signals need not be formed between semiconductor IC 70 and external-connection terminal 150, it is possible to save the surface area of principal surface 91b. In other words, it is possible to provide small-sized radio frequency module 1 having improvement in the signal quality of radio frequency signals input to and output from semiconductor IC 70.

Semiconductor IC 70 may further include ground electrode 71G on principal surface 70b.

This enables reduction of the total number of external-connection terminals 150 set to the ground potential, and thus, the surface area of principal surface 91b can be saved. Moreover, disposing ground electrodes 71G between signal electrodes 100A, 120A, and 160A enables improvement in isolation between switch 50, low noise amplifier 20, and PA control circuit 60.

As in radio frequency module 1A according to Working Example 1, signal electrode 120A may be connected to via conductor 24 provided in semiconductor IC 70.

With this configuration, transfer loss of the radio frequency signals transferred by radio frequency module 1A can be further reduced.

As in radio frequency module 1C according to Working Example 2, signal electrode 120C may be connected to side surface electrode 22 provided on a side surface of semiconductor IC 70C.

With this configuration, the radio frequency signals output from semiconductor IC 70C are output to the motherboard by passing, not through the inside of semiconductor IC 70C from a signal electrode formed on principal surface 70a, but through the side surface of semiconductor IC 70C and signal electrode 120C, and thus, it is possible to reduce the size of semiconductor IC 70C.

In radio frequency module 1, semiconductor IC 70 may include low noise amplifier 20, an output terminal of low noise amplifier 20 may be connected to reception output terminal 120, and signal electrode 120A may be reception output terminal 120.

Accordingly, reception signals amplified by low noise amplifier 20 can be transferred to the motherboard with low loss.

In radio frequency module 1, semiconductor IC 70 may include switch 50, switch 50 may include a common terminal and a plurality of selection terminals and may be configured to switch connection between the common terminal and the plurality of selection terminals, the common terminal being connected to antenna connection terminal 100, and signal electrode 100A may be antenna connection terminal 100.

Accordingly, transmission signals which are to be output via antenna connection terminal 100 can be transferred to the motherboard with low loss, and reception signals input to antenna connection terminal 100 from the motherboard can be transferred with low loss.

In radio frequency module 1C according to Working Example 2, semiconductor IC 70C may include PA control circuit 60, PA control circuit 60 may include an input terminal and an output terminal and may be configured to output a second control signal to power amplifier 10 via the output terminal based on a first control signal received via the input terminal, and signal electrode 160C may be the input terminal of PA control circuit 60.

With this configuration, a control line for transferring the first control signal can be shortened, and thus, it is possible to inhibit digital noise and power supply noise from flowing out from the control line.

Radio frequency module 1 according to the embodiment may further include power amplifier 10 that is disposed on principal surface 91a and is configured to amplify a transmission signal. In radio frequency module 1, PA control circuit 60 may be configured to output the second control signal to power amplifier 10 via the output terminal.

With this configuration, the heat dissipation path of power amplifier 10 can be other than a heat dissipation path that passes only through, among the lines provided in module board 91, a planar line pattern of high thermal resistance provided along the xy plane direction. Accordingly, it is possible to provide radio frequency module 1 having improvement in heat dissipation from power amplifier 10 to the motherboard.

Radio frequency module 1C according to Working Example 2 may further include matching circuit 31 connected to an output terminal of power amplifier 10 and including at least one of an inductor or a capacitor. In radio frequency module 1C, PA control circuit 60 may be disposed on principal surface 91b, matching circuit 31 may be disposed on principal surface 91a, and in a plan view of module board 91, a footprint of PA control circuit 60 may overlap with a footprint of matching circuit 31 at least partially, and power amplifier 10 and matching circuit 31 may be disposed next to each other.

This configuration makes it possible to shorten the line connecting power amplifier 10 and matching circuit 31, thus enabling reduction of transfer loss of transmission signals transferred by radio frequency module 1C. Furthermore, since a control line connecting power amplifier 10 and PA control circuit 60 can be shortened while securing the heat dissipation region of power amplifier 10, it is possible to inhibit digital noise and power supply noise from flowing out from the control line.

Radio frequency module 1A according to Working Example 1 may further include: matching circuit 32 connected to an input terminal of low noise amplifier 20 and including at least one of an inductor or a capacitor; and reception filter 40R connected between switch 50 and matching circuit 32 and configured to pass the reception signal. In radio frequency module 1A, switch 50 may be connected between antenna connection terminal 100 and reception filter 40R, low noise amplifier 20 and switch 50 may be disposed on principal surface 91b, matching circuit 32 and reception filter 40R may be disposed on principal surface 91a, and in a plan view of module board 91, a footprint of low noise amplifier 20 may overlap with a footprint of matching circuit 32 at least partially, and a footprint of switch 50 may overlap with a footprint of reception filter 40R at least partially.

This configuration makes it possible to shorten the line connecting low noise amplifier 20 and matching circuit 32 and shorten the line connecting switch 50 and reception filter 40R, thus enabling reduction of transfer loss of reception signals transferred by radio frequency module 1A.

Also, communication device 5 includes: RFIC 3 configured to process a radio frequency signal which is transmitted or received by antenna 2; and radio frequency module 1 configured to transfer the radio frequency signal between antenna 2 and RFIC 3.

Accordingly, it is possible to provide small-sized communication device 5 having improvement in the signal quality of radio frequency signals input to and output from the semiconductor IC.

Other Embodiments, Etc.

Although a radio frequency module and a communication device according to an embodiment of the present disclosure have been described based the embodiment, working examples, and variations, the radio frequency module and the communication device according to the present disclosure are not limited to the above embodiment, working examples, and variations. The present disclosure also encompasses other embodiments implemented by arbitrarily combining constituent elements in the above embodiment, working examples, and variations, as well as variations achieved through various modifications to the above embodiment, working examples, and variations that are conceivable to a person skilled in the art without departing from the essence of the present disclosure, and various apparatuses that include the above radio frequency module and communication device.

For example, in the radio frequency module and the communication device according to the above embodiment, working examples, and variations, circuit elements and lines, for instance, may be interposed between circuit elements and paths that connect signal paths illustrated in the drawings.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is widely applicable to communication apparatuses such as mobile phones, as a radio frequency module disposed in a multiband-compatible front-end portion.

The invention claimed is:
1. A radio frequency module, comprising:
a module board including a first principal surface and a second principal surface on opposite sides of the module board;
a semiconductor integrated circuit (IC) including a third principal surface and a fourth principal surface on opposite sides of the semiconductor IC;
an external-connection terminal disposed on the second principal surface; and
a connection electrode disposed on the third principal surface that connects the module board and the semiconductor IC and provides at least part of a signal path between the semiconductor IC and a component on the first principal surface side of the module board,
wherein the third principal surface faces the second principal surface and is closer to the second principal surface than the fourth principal surface is to the second principal surface, and
the semiconductor IC includes
at least one of (i) a control circuit configured to control a radio frequency component using a control signal, (ii) a low noise amplifier configured to amplify a reception signal, or (iii) a switch, and
a signal electrode disposed on the fourth principal surface, and via the signal electrode the semiconductor IC is configured to receive or output at least one of a radio frequency signal or the control signal.
2. The radio frequency module according to claim 1, wherein the semiconductor IC further includes
a ground electrode on the fourth principal surface.
3. The radio frequency module according to claim 1, wherein the signal electrode is connected to a via conductor provided in the semiconductor IC.
4. The radio frequency module according to claim 1, wherein the signal electrode is connected to a side surface electrode provided on a side surface of the semiconductor IC.
5. The radio frequency module according to claim 1, wherein the semiconductor IC includes the low noise amplifier,
an output terminal of the low noise amplifier is connected to a reception output terminal of the radio frequency module, and
the signal electrode is the reception output terminal.

6. The radio frequency module according to claim 1, wherein the semiconductor IC includes the switch,
the switch includes a common terminal and a plurality of selection terminals, and is configured to switch connection between the common terminal and the plurality of selection terminals, the common terminal being connected to an antenna connection terminal, and
the signal electrode is the antenna connection terminal.

7. The radio frequency module according to claim 1, wherein the semiconductor IC includes the control circuit,
the control circuit includes an input terminal and an output terminal, and is configured to output a second control signal to the radio frequency component via the output terminal based on a first control signal received via the input terminal, and
the signal electrode is the input terminal of the control circuit.

8. The radio frequency module according to claim 7, further comprising:
a power amplifier that is disposed on the first principal surface and is configured to amplify a transmission signal,
wherein the control circuit is configured to output the second control signal to the power amplifier via the output terminal.

9. The radio frequency module according to claim 8, further comprising:
a first impedance matching circuit connected to an output terminal of the power amplifier and including at least one of an inductor or a capacitor,
wherein the control circuit is disposed on the second principal surface,
the first impedance matching circuit is disposed on the first principal surface, and
in a plan view of the module board, a footprint of the control circuit overlaps with a footprint of the first impedance matching circuit at least partially, and the power amplifier and the first impedance matching circuit are disposed next to each other.

10. The radio frequency module according to claim 1, further comprising:
an impedance matching circuit connected to an input terminal of the low noise amplifier and including at least one of an inductor or a capacitor; and
a filter connected between the switch and the impedance matching circuit, and configured to pass the reception signal,
wherein the switch is connected between an antenna connection terminal and the filter,
the low noise amplifier and the switch are disposed on the second principal surface,
the impedance matching circuit and the filter are disposed on the first principal surface, and
in a plan view of the module board, a footprint of the low noise amplifier overlaps with a footprint of the impedance matching circuit at least partially, and a footprint of the switch at least partially overlaps with a footprint of the filter.

11. A communication device, comprising:
an antenna;
a radio frequency (RF) signal processing circuit configured to process a radio frequency signal which is transmitted or received by an antenna; and
the radio frequency module configured to transfer the radio frequency signal between the antenna and the Rh signal processing circuit, the radio frequency module including a module board including a first principal surface and a second principal surface on opposite sides of the module board;
a semiconductor integrated circuit (IC) including a third principal surface and a fourth principal surface on opposite sides of the semiconductor IC,
an external-connection terminal disposed on the second principal surface, and
a connection electrode disposed on the third principal surface that connects the module board and the semiconductor IC and provides at least part of a signal path between the semiconductor IC and a component on the first principal surface side of the module board,
wherein the third principal surface faces the second principal surface and is closer to the second principal surface than the fourth principal surface is to the second principal surface, and
the semiconductor IC includes
at least one of (i) a control circuit configured to control a radio frequency component using a control signal, (ii) a low noise amplifier configured to amplify a reception signal, or (iii) a switch, and
a signal electrode disposed on the fourth principal surface, and via the signal electrode the semiconductor IC is configured to receive or output at least one of a radio frequency signal or the control signal.

12. The communication device according to claim 11, wherein the semiconductor IC further includes
a ground electrode on the fourth principal surface.

13. The communication device according to claim 11, wherein the signal electrode is connected to a via conductor provided in the semiconductor IC.

14. The communication device according to claim 11, wherein the signal electrode is connected to a side surface electrode provided on a side surface of the semiconductor IC.

15. The communication device according to claim 11, wherein the semiconductor IC includes the low noise amplifier,
an output terminal of the low noise amplifier is connected to a reception output terminal of the radio frequency module, and
the signal electrode is the reception output terminal.

16. The communication device according to claim 11, wherein the semiconductor IC includes the switch,
the switch includes a common terminal and a plurality of selection terminals, and is configured to switch connection between the common terminal and the plurality of selection terminals, the common terminal being connected to an antenna connection terminal, and
the signal electrode is the antenna connection terminal.

17. The communication device according to claim 11, wherein the semiconductor IC includes the control circuit,
the control circuit includes an input terminal and an output terminal, and is configured to output a second control signal to the radio frequency component via the output terminal based on a first control signal received via the input terminal, and
the signal electrode is the input terminal of the control circuit.

18. The communication device according to claim 17, wherein the radio frequency module further comprising:
a power amplifier that is disposed on the first principal surface and is configured to amplify a transmission signal, wherein the control circuit is configured to output the second control signal to the power amplifier via the output terminal.

19. The communication device according to claim 18, wherein the radio frequency module further comprising:
   a first impedance matching circuit connected to an output terminal of the power amplifier and including at least one of an inductor or a capacitor,
   wherein the control circuit is disposed on the second principal surface,
   the first impedance matching circuit is disposed on the first principal surface, and
   in a plan view of the module board, a footprint of the control circuit overlaps with a footprint of the first impedance matching circuit at least partially, and the power amplifier and the first impedance matching circuit are disposed next to each other.

20. The communication device according to claim 11, wherein the radio frequency module further comprising:
   an impedance matching circuit connected to an input terminal of the low noise amplifier and including at least one of an inductor or a capacitor; and
   a filter connected between the switch and the impedance matching circuit, and configured to pass the reception signal,
   wherein the switch is connected between an antenna connection terminal and the filter,
   the low noise amplifier and the switch are disposed on the second principal surface,
   the impedance matching circuit and the filter are disposed on the first principal surface, and
   in a plan view of the module board, a footprint of the low noise amplifier overlaps with a footprint of the impedance matching circuit at least partially, and a footprint of the switch at least partially overlaps with a footprint of the filter.

* * * * *